United States Patent
Bondareva et al.

(10) Patent No.: US 11,501,397 B2
(45) Date of Patent: Nov. 15, 2022

(54) METHOD, SYSTEM AND COMPUTER PROGRAM PRODUCT FOR AUTOMATED PROCESSING, ENFORCEMENT AND INTELLIGENT MANAGEMENT OF VEHICLE OPERATION VIOLATIONS

(71) Applicant: MOTOROLA SOLUTIONS, INC., Chicago, IL (US)

(72) Inventors: Mariya Bondareva, Bollingbrook, IL (US); Zili Li, Chicago, IL (US); Pietro Russo, Melrose, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 344 days.

(21) Appl. No.: 16/782,770

(22) Filed: Feb. 5, 2020

(65) Prior Publication Data

US 2021/0241405 A1 Aug. 5, 2021

(51) Int. Cl.
*G06Q 10/10* (2012.01)
*G06Q 40/08* (2012.01)
(Continued)

(52) U.S. Cl.
CPC ......... *G06Q 50/265* (2013.01); *G06F 16/583* (2019.01); *G06N 3/04* (2013.01);
(Continued)

(58) Field of Classification Search
CPC .... G06Q 50/265; G06Q 40/02; G06F 16/583; G06N 3/04; G06N 3/08; G06V 10/32; G06V 20/52; G06V 20/625
(Continued)

(56) References Cited

U.S. PATENT DOCUMENTS 9,076,277 B2 7/2015 Delong
10,223,753 B1 3/2019 Marlow et al.
(Continued)

FOREIGN PATENT DOCUMENTS

JP H2019060664 A 4/2019
WO 2018142120 A1 8/2018

OTHER PUBLICATIONS

Balci, Burak & Artan, Yusuf & Alkan, Bensu & Elihos, Alperen. (2019). Front-View Vehicle Damage Detection using Roadway Surveillance Camera Images. 193-198. 10.5220/0007724601930198, all pages.
(Continued)

*Primary Examiner* — Jonathan P Ouellette

(57) ABSTRACT

Automated processing, enforcement and intelligent management of vehicle operation violations is disclosed. A method, that is also disclosed, includes obtaining at least one image within which is shown at least a portion of a vehicle. The method also includes receiving image data for the at least one image, and analyzing the image data to generate a violation score for each of one or more potential vehicle operation violations for the vehicle. When the violation score is in-between an upper violation threshold and a lower consideration threshold, user input is obtained that either affirms or rejects existence of a violation and then, once the user input is obtained, a violation notification is generated only when the user input affirms the existence of the violation. When the violation score is higher than the violation threshold, the violation notification is generated without the user input being obtained.

15 Claims, 3 Drawing Sheets

(51) Int. Cl.

| | | |
|---|---|---|
| *G06Q 10/06* | (2012.01) | |
| *G06Q 30/02* | (2012.01) | |
| *G06Q 30/06* | (2012.01) | |
| *G06Q 50/26* | (2012.01) | |
| *G06F 16/583* | (2019.01) | |
| *G06N 3/04* | (2006.01) | |
| *G06Q 40/02* | (2012.01) | |
| *G06V 10/32* | (2022.01) | |
| *G06V 20/52* | (2022.01) | |
| *G06V 20/62* | (2022.01) | |

(52) U.S. Cl.
CPC .............. *G06Q 40/02* (2013.01); *G06V 10/32* (2022.01); *G06V 20/52* (2022.01); *G06V 20/625* (2022.01)

(58) Field of Classification Search
USPC .................................................. 705/1.1, 325
See application file for complete search history.

(56) References Cited

U.S. PATENT DOCUMENTS

2018/0211117 A1* 7/2018 Ratti ...................... G06N 3/084
2021/0067745 A1* 3/2021 Rosenberg ........... H04N 9/8205

OTHER PUBLICATIONS

Patil, Kalpesh & Kulkarni, Mandar & Sriraman, Anand & Karande, Shirish. (2017). Deep Learning Based Car Damage Classification. 50-54. 10.1109/ICMLA.2017.0-179, all pages.

* cited by examiner

METHOD, SYSTEM AND COMPUTER PROGRAM PRODUCT FOR AUTOMATED PROCESSING, ENFORCEMENT AND INTELLIGENT MANAGEMENT OF VEHICLE OPERATION VIOLATIONS

BACKGROUND

Certain deficiencies and conditions present in a car, truck, van, Sport Utility Vehicle (SUV), or other vehicle can increase the risk of dangerous operation in relation to that vehicle. For example, vehicle windows and windshields can cause driving problems if they are of a type or condition that would be expected to impair the vehicle driver's ability to see an object on the road ahead of him. Thus, these glass surfaces (especially front windshields) are regulated.

Vehicle operation violations are of course not limited to only windows and windshields. As a different example in this regard, in certain jurisdictions certain types of tires may not be allowed on vehicles. For instance, winter studs are not permitted during the summer-time in Alaska, USA, and in Quebec, Canada where winters are long and snow-filled, summer tires are not permitted from December $1^{st}$ to March $15^{th}$.

Regarding the previously mentioned example of window and windshield requirements, these differ from one jurisdiction to the next and they concern tint, obstruction of view, cracks, chips, and other types of damage and defects. To enforce compliance, police officers must stop the vehicles where a violation is suspected. Additionally, standards will differ from one jurisdiction to the next, and sometimes it is not clear what should be considered a violation. If the road regulation is not written in bright-line language, then it may be up to the ticketing officer's discretion as to whether the cracks, chips or other damage/defects he or she finds will impact the driver's ability to see while driving. Also, some jurisdictions require that wipers must be able to provide a clear view under adverse weather. Tickets in such jurisdictions may be issued if the windshield wipers are broken or otherwise deficient to the extent that they are not capable of removing snow, rain, sleet, and other moisture to provide a clear view through the glass while driving.

It can be dangerous to stop cars or other vehicles. Thus, it will be understood that minimizing the interaction of the police officers with the drivers is a potential impact of automation. To sum up, it may be time consuming and dangerous to stop vehicles to enforce tire compliance, window and windshield compliance, lighting compliance, cargo securing compliance, etc. in relation to the standards of the applicable jurisdiction. Also, the compliance standards may be vaguely defined resulting in issuing unnecessary fines (false positives), and failing to recognize non-complying windows, windshields, or other vehicle parts (false negatives).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
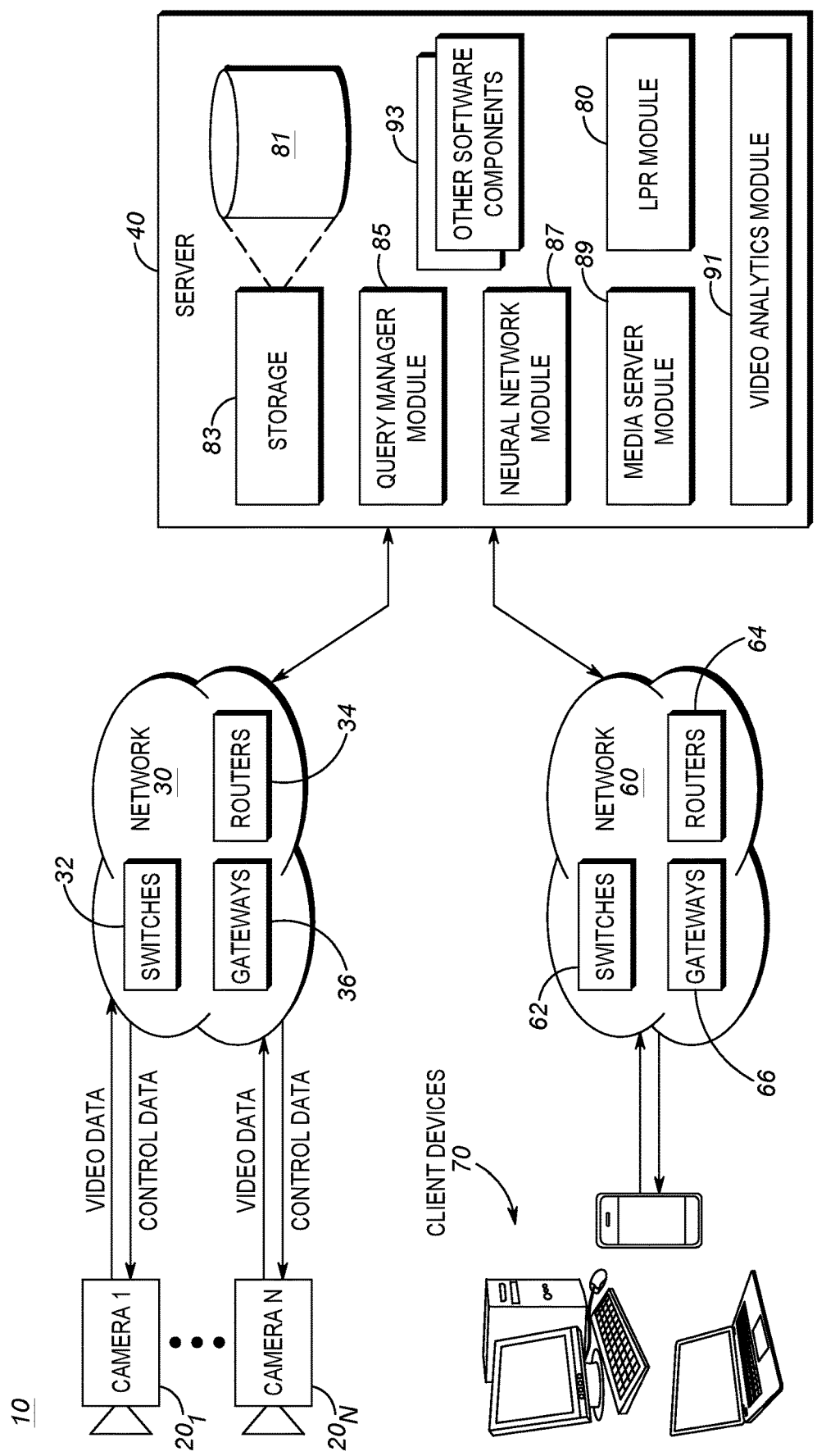
FIG. 1 is a block diagram of a system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a method that includes obtaining at least one image within which is shown at least a portion of a vehicle. The method also includes receiving, at an at least one processor, image data for the at least one image. The method also includes analyzing, using the at least one processor, the image data to generate a violation score for each of one or more potential vehicle operation violations for the vehicle. When the violation score is in-between an upper violation threshold and a lower consideration threshold, user input is obtained (by prompting) that either affirms or rejects existence of a violation and then, once the user input is provided, a violation notification is generated only when the user input affirms the existence of the violation. When the violation score is higher than the violation threshold, the violation notification is generated without the user input being provided.

According to yet another example embodiment, there is provided a system that includes a camera configured to obtain at least one image within which is shown at least a portion of a vehicle. The system also includes at least one processor configured to receive image data for the at least one image. The system also includes at least one tangible, non-transitory, computer-readable storage medium having instructions encoded therein, wherein the instructions, when executed by the at least one processor, causes a carrying out of a method that includes analyzing the image data to generate a violation score for each of one or more potential vehicle operation violations for the vehicle. When the violation score is in-between an upper violation threshold and a lower consideration threshold, user input is obtained (by prompting) that either affirms or rejects existence of a violation and then, once the user input is obtained, a violation notification is generated only when the user input affirms the existence of the violation. When the violation score is higher than the violation threshold, the violation notification is generated without the user input being obtained.

Each of the above-mentioned embodiments will be discussed in more detail below, starting with example system and device architectures of the system in which the embodiments may be practiced, followed by an illustration of processing blocks for achieving an improved technical method, device, and system for automated processing, enforcement and intelligent management of vehicle operation violations. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "road" as used herein is understood to mean a prepared surface (paved or unpaved) suitable for ordinary vehicles to drive over and includes roads, streets, highways, alleys, lanes, boulevards, etc.

Further advantages and features consistent with this disclosure will be set forth in the following detailed description, with reference to the figures.

Referring now to the drawings, and in particular FIG. 1, which is a block diagram of a system 10. The illustrated system 10 includes a plurality of cameras $20_1$-$20_n$ which are coupled to a network 30 (which may comprise a plurality of networks, even though shown as a single network in FIG. 1 for convenience of illustration). The network 30 can include the Internet, or one or more other public/private networks coupled together by communication elements: for example, one or more network switches 32, one or more routers 34, and/or one or more gateways 36. The network 30 could be of the form of, for example, client-server networks, peer-to-peer networks, etc. Data connections between any of the cameras $20_1$-$20_n$ and other network devices can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the cameras $20_1$-$20_n$ and the other illustrated network devices are within the same Local Area Network (LAN).

Still with reference to FIG. 1, the cameras $20_1$-$20_n$ communicate data and information to and from other network devices via the network 30. Two examples of such data and information, amongst other examples, are shown for convenience of illustration. For instance, the cameras $20_1$-$20_n$ transmit video data to one or more other network devices via the network 30. As another example, the cameras $20_1$-$20_n$ receive control data from other network devices via the network 30. In some example embodiments, the cameras $20_1$-$20_n$ are fixed-mounted types of video cameras such as, for instance, License Plate Recognition (LPR) cameras, Pan-Tilt-Zoom (PTZ) cameras, box cameras, bullet cameras, etc. In other example embodiments, the cameras $20_1$-$20_n$ are some other type of camera such as, for instance, body-worn cameras, police vehicle cameras, dash cameras, etc. Also, it will be understood that the cameras $20_1$-$20_n$ need not all be of homogeneous type, and any suitable combination of cameras of different types (i.e. a heterogeneous combination of cameras) is also contemplated.

Also shown in FIG. 1 is a server 40 which is coupled to the network 30 to receive data and information from other devices on the network 30 such as, for example, any of the cameras $20_1$-$20_n$. The Server 40 is also coupled to any suitable number of client devices 70 via a network 60 in order that the Server 40 may, for example, send and receive data and information between the client devices 70 and the server 40.

Regarding the network 60, this may comprise a plurality of networks even though shown as a single network in FIG. 1 for convenience of illustration. The network 60 can include the Internet, or one or more other public/private networks coupled together by communication elements: for example, one or more network switches 62, one or more routers 64, and/or one or more gateways 66. The network 60 could be of the form of, for example, client-server networks, peer-to-peer networks, etc. Data connections between any of the client devices 70 and other network devices can be any number of known arrangements for accessing a data communications network, such as, for example, dial-up SLIP/PPP, ISDN, dedicated lease line service, broadband (e.g. cable) access, DSL, ATM, Frame Relay, or other known access techniques (for example, RF links). Although in the illustrated example embodiment the network 30 and the network 60 are shown as separate, in some examples there may be some overlap and commonality between the network 30 and the network 60. In at least one example, the network 60 and the network 30 may be the same network.

Still with reference to FIG. 1, the illustrated server 40 includes an LPR module 80. The LPR module 80 enables various LPR-related functions including, for example, license plate localization, license plate sizing and orientation (adjusting), normalization, character segmentation, Optical Character Recognition (OCR) and syntactical/geometrical analysis. The server 40 also includes a database 81 maintained within storage 83. Amongst other things, the database 81 is organized storage for: i) images and/or video footage of historic cracks that are classified as violations; and ii) images and/or video footage of acceptable defects. It will be understood that what is a violation versus what is an acceptable defect will vary based on a plurality of different factors including, for example, the laws and regulations of the particular jurisdiction (e.g. state or province), and the severity of the crack and/or damage in question. The database 81 may also provide for similar organized storage of images and/or video footage in relation to other types of violations and counter-example non-violations (including wrong type of vehicle tire being used, window or windshield structural integrity, window/windshield/mirror visibility impairment, lighting issues, cargo securing issues, etc.).

The server 40 also includes a query manager module 85 (provides any of the client devices 70 an interface for retrieving information from the database 81), a neural network module 87 (explained later herein), a media server module 89 (explained later herein), and a video analytics module 91 (explained later herein). The server 40 also includes other software components 93. These other software components will vary depending on the requirements of the server 40 within the overall system. As just one example, the other software components 93 might include special test and debugging software, or software to facilitate version updating of modules within the server 40.

Figure 2:
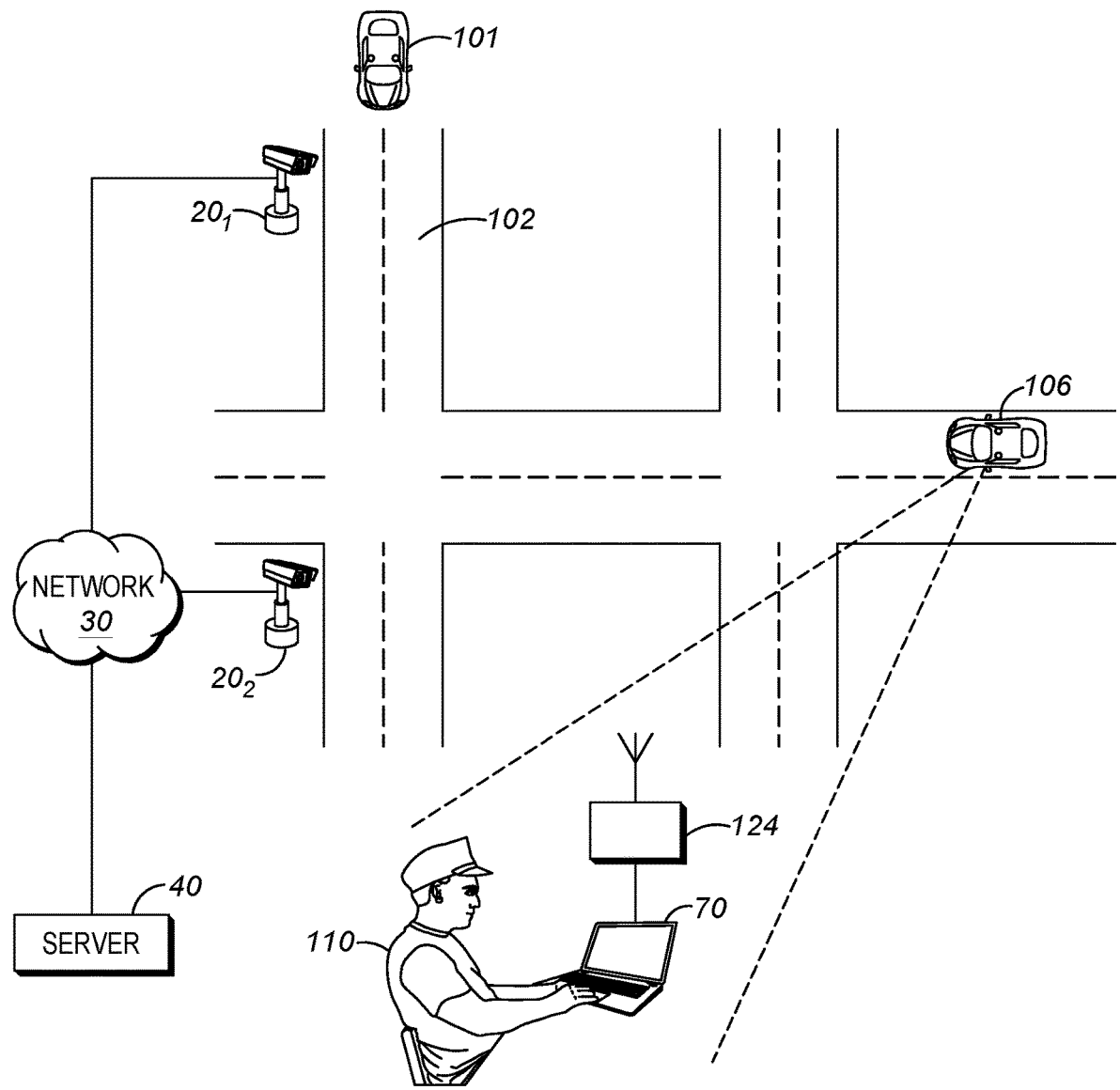
FIG. 2 is a schematic diagram of a practical implementation, in accordance with example embodiments, of the system of FIG. 1.

Reference is now made to FIG. 2. FIG. 2 is a schematic diagram of a practical implementation, in accordance with example embodiments, of the system of FIG. 1. In the illustrated example implementation, vehicle 101 is driving along road 102 in a geographic region 103 within which the system 10 is present. As the vehicle 101 continues to drive along the road 102, it passes in a Field of View (FOV) of a first camera $20i$. During this time period, images captured by the first camera $20_1$ include the vehicle 101, and these images are processed within the video analytics module 91 (shown in FIG. 1 within the server 40; however this module need not be entirely within the server 40, and may alternatively be partly or entirely within another device such as, for example, the camera $20_1$). By operation of the video analytics, any number of various potential vehicle operation violations may be detected, including but not limited to any number of the following:

Potential violation relating to window and windshield structural integrity (such as, for example, cracks, chips, defects or other damage)

Potential violation relating to permanent/semi-permanent window, windshield or mirror visibility impairment (such as, for example, over-tinting, tinting more than 5% below the top of the windshield, certain less tolerated types of tinting including mirror tinting, visibility impairment due to affixed posters, sticks or signs being non-transparent, etc.)

Potential violation relating to temporary window, windshield or mirror visibility impairment (such as, for example, the video analytics detecting during rain/snow that the vehicle driver is not visible and then determining that this is resulting from rain/snow visibility impairment, the video analytics detecting inadequate/non-functional windshield wipers, etc.)

Potential violation relating to the wrong type of tire being used (winter studs on tires when not permitted, a summer tire being used in the winter, etc.)

Potential violation relating to lighting (taillight out, headlight out, headlight too bright, tinted headlights, etc.)

Other potential violation that could impact other motorists sharing the road with the vehicle (such as, for example, excessive vision impairing exhaust fumes, improper securing of objects including, for instance, cargo, rocks on construction equipment or on the vehicle itself, etc.)

Still with reference to the example embodiment of FIG. 2, where the camera $20_1$ and/or the camera $20_2$ is an LPR camera, the camera in communication with the LPR module 80 can operate to identify the license plate number (and thereby identify the registered owner) of the vehicle 101. In the case where license plate recognition is not available, the registered owner of the vehicle 101 may be identified in some other manner such as, for example, by way of communications from a vehicle transponder attached to or within the vehicle 101.

Also present within the illustrated geographic region 103 is a police car 106. Inside the police car 106 is a policeman 110 with a client device 70 (for example, a police force-assigned laptop). In the illustrated example, the client device 70 is connected to another device 124 that provides an 802.11 wireless connection through to a wide area network so that the client device 70 can engage in wireless communications with other parts of the system 10. For example, the policeman 110 may receive, at the client device 70, an electronic notification of a confirmed violation by the vehicle 101, and in response the policeman 110 may take corresponding action such as, for example, driving the police car 106 to intercept the vehicle 101 and issue the applicable violation notice and fine.

Also, while it will be understood that real time (or near real time) violation notification and enforcement is consistent with some example embodiments, other embodiments relate to after the fact (post-occurrence) notification and enforcement, thus eliminating reliance on a police car or the like to intercept a vehicle found in violation by the system 10. Thus, the police car 106 and the policeman 110 may alternatively be replaced by person(s) and client device(s) remote from the geographic region 103. It is noted that usually where there is no human involvement to stop the vehicle, then the violation notice issued is at most a fine with no accompanying demerit points. This is because demerit points are driver specific (thus, taking the illustrated example embodiment as an example, the identity of the person driving the vehicle 101 is needed). By contrast, fines can be meted out merely by identifying the owner of the vehicle 101 (which may or may not be the same as the person actually driving the vehicle 101).

Figure 3:
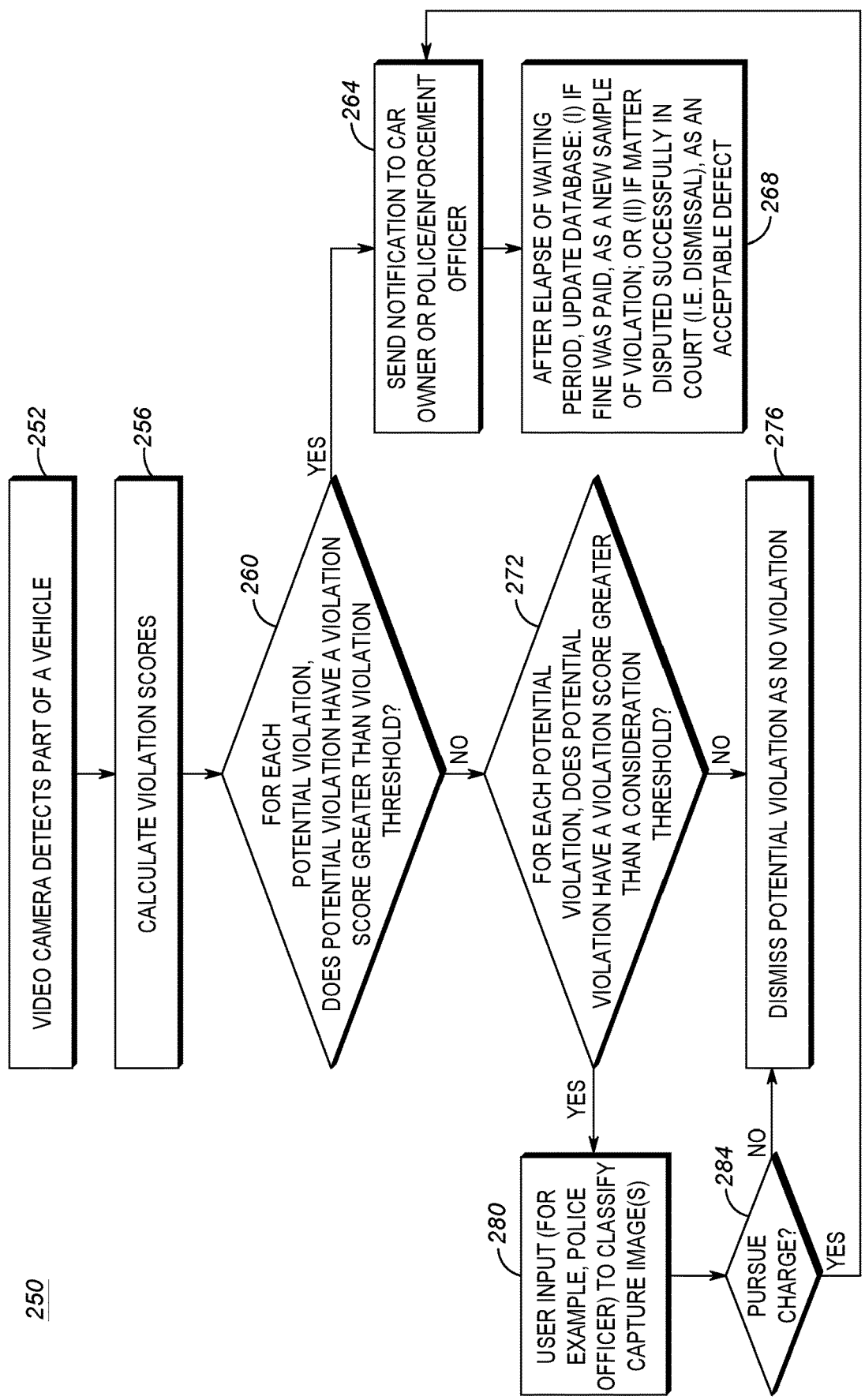
FIG. 3 is a flow chart illustrating a method for automated processing of vehicle operation violations in accordance with an example embodiment.

Reference is now made to FIG. 3. FIG. 3 is a flow chart illustrating a method 250 for automated processing of vehicle operation violations. Initially, a video camera detects (252) a part or parts of a vehicle. For example, any number of the following may be detected within video captured by one of the cameras $20_1$-$20_n$ (FIG. 1): a front windshield, left/right-front window(s), one or more tires of the vehicle, one or more lights of the vehicle, one or more objects/cargo secured to the vehicle. Also, it will be understood that in some examples video analytics follows a one-to-one analysis in the sense that for each potential violation there is one part of the vehicle is analyzed; however in other alternative examples the analysis may not be one-to-one. For example, in some jurisdictions a missing right side rear-view mirror does not by itself conclusively establish a violation. Instead at least one other different part of the vehicle must be examined (for instance, if the rear windshield is tinted then there is a violation, but if the rear windshield is fully transparent then there is no violation assuming the vehicle has both left and center rear-view mirrors). Thus, in at least some examples the video analytics module 91 is configured to carry out video analytics corresponding to both types of violation scenarios.

Next, subsequent to the video processing, violation scores are calculated (256). For instance, a processor within one of the cameras $20_1$-$20_n$ or the server 40 may be running one or more neural networks (illustratively represented by, for example, the neural network module 87) in connection with the action 256.

Next, for each potential violation, it is determined (260) whether or not the potential violation has a violation score greater than a violation threshold. If yes, a corresponding notification is sent (264). For example, a notification may be displayed on one of the client devices 70 assigned to a police officer (or other enforcement officer). As another example, a violation letter may be generated (which may then be mailed to the registered owner of the vehicle). Next, subsequent to some period of time after the sending 264 of the notification, a database (for example, the database 81) may be updated (268) as follows: i) if a fine was paid, then updated as a new sample of the violation; or ii) if the vehicle owner successfully disputed the ticket (for example, obtained a dismissal in court) then updated as an acceptable defect (i.e. non-violation).

With reference again to the decision action 260, if the violation score is not greater than a violation threshold, then decision action 272 follows. Specifically, for each potential violation, it is determined whether or not the potential violation has a violation score greater than a consideration threshold. If no, the potential violation is dismissed (276) as no violation. If yes, then instead action 280 follows, and user input is expected (from a police officer, for example) to classify the images(s) captured as evidence. In connection with the action 280, the relevant images/video footage, as well as comparative reference images/video footage may be delivered to one of the client devices 70 (FIG. 1). In this regard, the media server module 89 handles client requests related to storage and retrieval of video and images within the system 10.

Next, following receipt of the user input at the action 280 of the illustrated method 250, a determination 284 is made as to whether the respective charge is pursued. If yes, the action 264 follows. If no, the action 276 follows.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot compare an input image against reference images to calculate violation scores, among other features and functions set forth herein).

In the foregoing specification, specific embodiments have been described. However, one of ordinary skill in the art appreciates that various modifications and changes can be made without departing from the scope of the invention as set forth in the claims below. For example, while some example embodiments have been herein explicitly described as relating to an automated processing and enforcement system that is mostly or completely under the control and operation of a government entity (e.g. municipal government entity, state/provincial government entity, federal government entity), other example embodiments are contemplated where a first part of the control and operation rest with a government entity and a second part of the control and operation rest with a private entity. For instance, a private entity might own and operate a private parking garage with cameras capable of capturing images/video of vehicles showing potential violations existing at periods of time where these vehicles are exiting the parking garage and driving onto a public road. Such a private entity might enter an agreement with a government entity with jurisdiction over that public road to provide such captured images/video for enforcement of applicable laws and regulations.

Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method comprising:
 obtaining at least one image within which is shown at least a portion of a vehicle;
 receiving, at an at least one processor, image data for the at least one image;
 analyzing, using the at least one processor, the image data to generate a violation score for each of one or more potential vehicle operation violations for the vehicle;
 when the violation score is in-between an upper violation threshold and a lower consideration threshold, prompting to obtain user input that either affirms or rejects existence of a violation and then, once the user input is obtained, generating a violation notification only when the user input affirms the existence of the violation;
 when the violation score is higher than the upper violation threshold, generating the violation notification without the user input being obtained, and
 wherein at least one neural network and a database of reference images for affirmed and dismissed historical violations are employed in generating the violation score.

2. The method as claimed in claim 1 further comprising:
 capturing, using a camera, at least one additional image within which is shown a license plate of the vehicle; and
 carrying out Optical Character Recognition (OCR) on the at least one additional image to identify a license plate number corresponding to the license plate.

3. The method as claimed in claim 2 wherein the camera is a License Plate Recognition (LPR) camera pointed at a road.

4. The method as claimed in claim 1 wherein the potential vehicle operation violation relates to window or windshield structural integrity.

5. The method as claimed in claim 1 wherein the potential vehicle operation violation relates to window, windshield or mirror visibility impairment.

6. The method as claimed in claim 1 wherein the analyzing includes comparing the image data for the at least one image against image data for a number of the reference images.

7. The method as claimed in claim 1 further comprising:
 obtaining additional information indicating that either a fine associated with the potential vehicle operation violation was paid or that the potential vehicle operation violation was dismissed; and
 updating, once the additional information has been obtained, the database to include the at least one image as a new reference image.

8. A system comprising:
 a camera configured to obtain at least one image within which is shown at least a portion of a vehicle;
 at least one processor configured to receive image data for the at least one image;
 at least one tangible, non-transitory, computer-readable storage medium having instructions encoded therein, wherein the instructions, when executed by the at least one processor, causes a carrying out of a method that includes:

analyzing the image data to generate a violation score for each of one or more potential vehicle operation violations for the vehicle;

when the violation score is in-between an upper violation threshold and a lower consideration threshold, prompting to obtain user input that either affirms or rejects existence of a violation and then, once the user input is obtained, generating a violation notification only when the user input affirms the existence of the violation;

when the violation score is higher than the upper violation threshold, generating the violation notification without the user input being obtained at least one neural network; and a database of reference images for affirmed and dismissed historical violations, the database being coupled to the at least one neural network for cooperative operation therewith in generating the violation score.

9. The system as claimed in claim 8 further comprising:

a License Plate Recognition (LPR) camera configured to capture at least one additional image within which is shown a license plate of the vehicle, and wherein the method further includes:

carrying out Optical Character Recognition (OCR) on the at least one additional image to identify a license plate number corresponding to the license plate.

10. The system as claimed in claim 8 wherein the potential vehicle operation violation relates to window or windshield structural integrity.

11. The system as claimed in claim 8 wherein the potential vehicle operation violation relates to window, windshield or mirror visibility impairment.

12. The system as claimed in claim 8 wherein the analyzing includes comparing the image data for the at least one image against image data for a number of the reference images.

13. The system as claimed in claim 8 wherein the method further includes:

obtaining additional information indicating that either a fine associated with the potential vehicle operation violation was paid or that the potential vehicle operation violation was dismissed; and updating, once the additional information has been obtained, the database to include the at least one image as a new reference image.

14. The system as claimed in claim 8 further comprising a client device having a display, and wherein the client device is configured to output the violation notification onto the display.

15. The system as claimed in claim 14 further comprising a server remote from the client device, and wherein the computer-readable storage medium is contained in the server.

* * * * *